May 8, 1962 F. W. SCHAFFER 3,032,827
METHOD OF INSTALLING UNDERGROUND PIPE
Filed Jan. 12, 1959
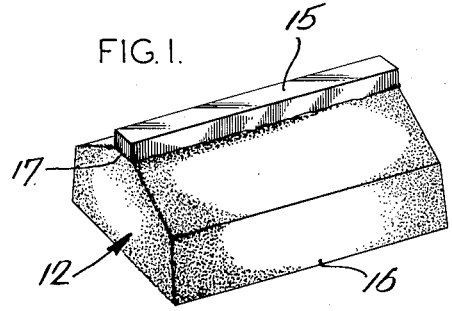
FIG. 1.
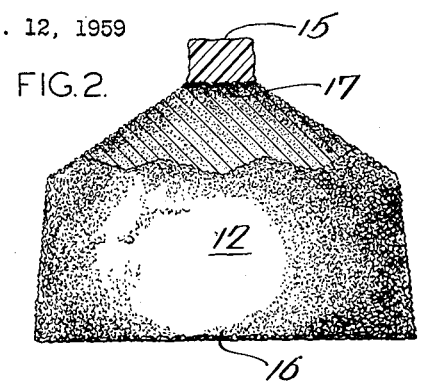
FIG. 2.
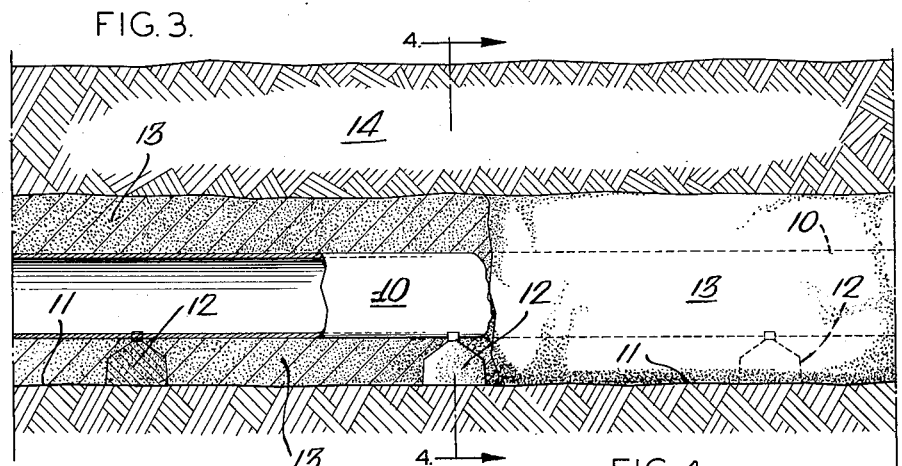
FIG. 3.
FIG. 4.
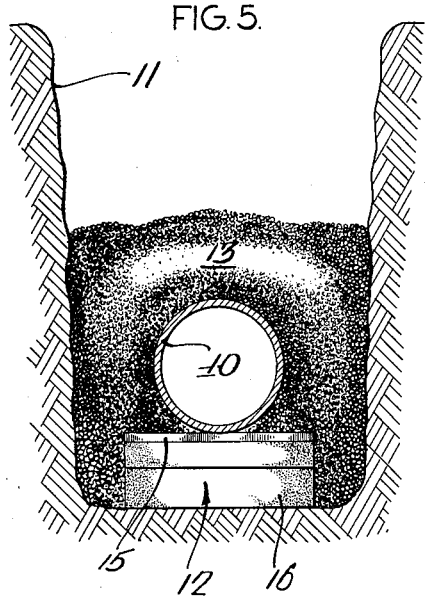
FIG. 5.
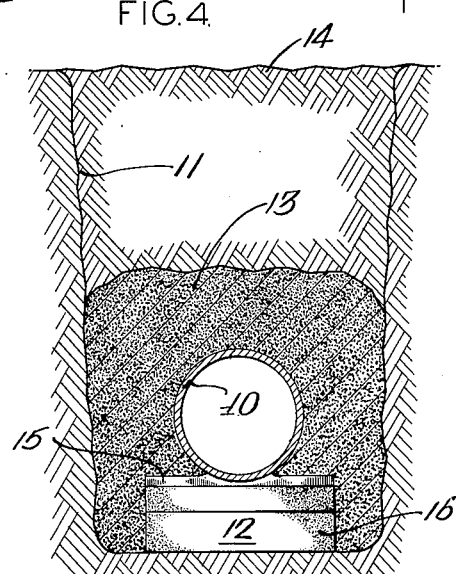
INVENTOR:
FRANK W. SCHAFFER
BY Howson & Howson
ATTYS

United States Patent Office 3,032,827
Patented May 8, 1962

3,032,827
METHOD OF INSTALLING UNDERGROUND PIPE
Frank W. Schaffer, Wynnewood, Pa., assignor to Perlite Products Company, Primos, Del., a corporation of Pennsylvania
Filed Jan. 12, 1959, Ser. No. 786,325
2 Claims. (Cl. 18—59)

The present invention relates to a method for installing an underground pipe system and has particular application to a system in which the pipe is supported at a point above the base of a trench and is surrounded by a bed of insulating fill material. The invention provides a pipe support having a deformable supporting surface in which the pipe is embedded.

A typical method of installation of an underground pipe system consists of supporting a pipe or a series of pipes at a distance above the base of a trench on a rigid support member so that either a point-to-point or line-to-line contact exists between pipe and support. A suitable fill material is deposited in the trench to a specified depth surrounding the pipe and then is packed with a suitable tamping tool. When the fill material is a fusible insulating material in granular form, heat is introduced into the pipe system to convert the fill material into a solid mass surrounding the pipe. Backfill of dirt or the like is added to cover the insulating mass. One of the difficulties encountered in installations of this type is the formation of voids or pockets under the pipes along the entire length of the pipe and in the vicinity of the support, notwithstanding efforts to firmly pack the fill material around the pipe. Accumulation of water in these pockets leads to corrosion of the pipe and consequent breakdown of the system. In systems where an insulating mass is formed around the pipe it is often difficult to locate the damaged portion of the pipe since leakage through the insulating mass may occur at a point removed from the actual break in the pipe.

The pipe support eliminates voids or pockets adjacent the pipe in installations of underground pipe systems. A pipe support is provided having a thermoplastic support surface upon which the pipe rests. Application of heat to the pipe after the pipe and fill material have been installed in the usual manner plasticizes the thermoplastic supporting surface and permits the pipe to settle in the fill material and to embed itself in the plasticized support member and thereby provide an arcuate surface-to-surface contact between pipe and support. Accordingly a tightly packed relationship is created between the pipe and fill along the length of the pipe and between the support, the pipe and the fill at the support member, thereby precluding formation of voids or pockets.

With the foregoing in mind the primary object of the invention is to provide a novel method for installing underground pipe systems wherein a pipe surrounded by a fusible fill material embeds itself in a thermoplastic support member and settles in the fill material upon application of heat to the pipe and thereby provides a tightly packed union between the fill and the pipe and the support at the support member and between the fill and the pipe along the entire length of the pipe.

These and other objects of the present invention and the various features and details of the method of installation and the construction of the support member are hereinafter more fully set forth and described with reference to the accompanying drawings, in which:

FIG. 1 is a perspective view of a pipe support embodying the present invention;

FIG. 2 is an enlarged end view partially in section of the support of FIG. 1;

FIG. 3 is a side elevational view partial in section of an underground pipe installation illustrating the pipe support of the present invention;

FIG. 4 is a sectional view taken along line 4—4 of FIG. 3; and

FIG. 5 is a typical trench section similar to FIG. 4 illustrating the position of pipe and fill material prior to heating the pipe.

Referring to the drawing, and particularly FIGS. 3–5 thereof, the system embodying the present invention comprises a pipe 10 supported above the bottom of a trench 11 by a support member 12. The trench 11 is substantially wider and deeper than the pipe to receive fill material 13 which surrounds the pipe 10 and support member 12 and is covered by back fill 14 of dirt or the like. Preferably the fill material 13 is an agglomerate fusible insulating material which is granular in form when installed but fuses into a solid mass surrounding the pipe when subjected to heat and pressure. One of the fusible fill materials suitable as an insulating material is a composition of a uniform refined heat-stable bituminous material and a pre-coated expanded perlite aggregate (sold under the trade name Insulfill by the Insul-Fill Company, Inc.).

In accordance with the invention, the supporting surface 15 of the support member 12 is deformable so that the pipe 10 may be embedded in a recess in the surface which conforms to the contour of the pipe. When thus embedded, the installation provides a continuous contact between the pipe and the support which is free of voids or pockets which may collect water and cause corrosion. A continuous contact between the underside of the pipe and the fill material is provided as a result of the pipe settling along its entire length in the fill material.

In the preferred embodiment of the present invention, the pipe support comprises, as shown in FIGS. 1 and 2, a base member 16 and an upper marginal portion 17 forming the deformable supporting surface 15. The base member is generally rectangular and may be formed of any suitable load-supporting material as for example clay or concrete, and additionally may be coated with a protective outer layer of tar or the like. The upper marginal portion 17 comprises a non-metallic thermoplastic material in the form of a strip of generally rectangular cross section mounted on the base and extending longitudinally thereof. The support member may be any non-heat-conducting, thermoplastic material that plasticizes at approximately steam temperature such as for example tar or asphalt.

The method of installing an underground pipe system in accordance with the present invention may be best described with reference to FIGS. 3–5. A plurality of pipe supports are placed along the trench 11 transversely to the line of the trench at predetermined space intervals. The spacing of the supports depends on the condition of the soil; that is in spongy or compressive soil the supports are positioned in closer relationship than in dry, firm noncompressive soil. Additionally strength of the pipe is a factor in determining proper spacing of the supports. The pipe 10 is then placed on these supports as indicated in FIG. 5 and the fill material 13 is inserted into the trench to a depth sufficient to cover the pipe a specified amount depending on type of installation and the load the filled trench is required to support. When the fill material is a fusible insulating material in granular form, the pipe is surrounded by this fusible material to a predetermined depth. The fill material is then packed in place around and against the pipe by a suitable tamping tool, and the pipe is heated to cause it to embed itself in the support as shown in FIG. 4. Heat is introduced into the pipe for the two-fold purpose of (1) causing the pipe to embed itself in the thermoplastic support member, and (2) fusing the fill material into an integral mass around the pipe and support. The remainder of the trench is then filled in with a suitable back fill material 14 of dirt or the like. In some instances where installations are made in dry soil, the trench may be back filled with dirt or the like prior to the application of heat to fuse the granular into an insulating mass. The pipe system is heated to a temperature of 220° F. or higher and maintained at that temperature for a predetermined length of time which is sufficient to fuse the granular fill material. A separate heating medium may be introduced or the fluid being conveyed through the pipe system may supply the necessary heat.

The method of the present invention provides a simple and expeditious method of installing an underground pipe system wherein an integral relationship between pipe, support and fill material is insured thereby eliminating the possibility of voids or pockets surrounding the pipe. Since the support portion 17 is deformed when the pipe is in place, it is not necessary to position the pipe precisely in the trench relative to the supports and consequently installation of a pipe system in accordance with the present invention is accomplished rapidly by ordinary workmen.

The method of installing an underground pipe system in accordance with the present invention may be utilized as effectively in multi-pipe installations wherein the pipes are positioned on the same support member in parallel array.

While a particular embodiment of the present invention has been illustrated and described herein it is not intended to limit the invention to such a disclosure and changes and modifications may be incorporated and embodied therein within the scope of the following claims.

I claim:

1. A method of installing an underground pipe which comprises the steps of supporting a pipe on an underground thermoplastic supporting surface, surrounding the pipe and support with a fusible agglomerate fill material, heating the pipe to plasticize the supporting surface to permit displacement of the pipe into the supporting surface to provide a continuous surface-to-surface contact between the pipe and supporting surface and also to fuse the fill material into an integral mass about the pipe and support in intimate contact with the support and the outer periphery of the pipe.

2. A method of installing an underground pipe which comprises the steps of providing a trench substantially wider and deeper than said pipe, mounting a plurality of supports at spaced intervals along the trench, said supports having an upper marginal portion of thermoplastic material, laying said pipe on the upper marginal portion of said supports, pouring a fusible agglomerate fill material into said trench to a level above said pipe, and heating the pipe to plasticize the upper marginal portion of the support underlying the pipe to permit displacement of the pipe into said marginal portion to provide a surface-to-surface contact between the pipe and marginal portion and also to fuse the fill material into an integral mass about the pipe and support in intimate contact with the support and the outer periphery of the pipe.

References Cited in the file of this patent

UNITED STATES PATENTS

| | | |
|---|---|---|
| 677,109 | Yaryan | June 25, 1901 |
| 1,298,258 | Richards | Mar. 25, 1919 |
| 2,003,580 | Craighead | June 4, 1935 |
| 2,013,865 | Sloan | Sept. 10, 1935 |
| 2,064,435 | Loeffler | Dec. 15, 1936 |
| 2,682,111 | Kish | June 29, 1954 |
| 2,740,226 | Arff | Apr. 3, 1956 |
| 2,774,383 | Kidd | Dec. 18, 1956 |
| 2,778,406 | Bramble | Jan. 22, 1957 |
| 2,814,835 | Faulkner | Dec. 3, 1957 |
| 2,828,800 | Hopkins et al. | Apr. 1, 1958 |
| 2,878,524 | Fink | Mar. 24, 1959 |
| 2,891,749 | Heverly | June 23, 1959 |
| 2,901,775 | Goff | Sept. 1, 1959 |